(12) United States Patent
Baltz et al.

(10) Patent No.: US 12,631,828 B2
(45) Date of Patent: May 19, 2026

(54) ROTARY JOINT SYSTEM

(71) Applicant: Northrop Grumman Systems Corporation, Falls Church, VA (US)

(72) Inventors: Ethan Karl Christian Baltz, Ames, IA (US); Justin S. Grayer, Chicago, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 724 days.

(21) Appl. No.: 17/992,015

(22) Filed: Nov. 22, 2022

(65) Prior Publication Data

US 2024/0168236 A1 May 23, 2024

(51) Int. Cl.
| | |
|---|---|
| *G02B 6/36* | (2006.01) |
| *G02B 6/02* | (2006.01) |
| *G02B 6/42* | (2006.01) |

(52) U.S. Cl.
CPC ....... *G02B 6/3604* (2013.01); *G02B 6/02361* (2013.01); *G02B 6/4296* (2013.01)

(58) Field of Classification Search
CPC ................................................... G02B 6/3604
See application file for complete search history.

(56) References Cited

U.S. PATENT DOCUMENTS

| | | | | |
|---|---|---|---|---|
| 4,725,116 A | * | 2/1988 | Spencer | G02B 6/3604 385/52 |
| 4,934,783 A | * | 6/1990 | Jacobson | G02B 6/3604 385/33 |

| | | | | |
|---|---|---|---|---|
| 6,020,955 A | | 2/2000 | Messina | |
| 7,688,247 B2 | | 3/2010 | Anschel et al. | |
| 7,760,976 B1 | | 7/2010 | Tidwell | |
| 7,876,985 B2 | * | 1/2011 | Popp | G02B 27/642 385/35 |

(Continued)

FOREIGN PATENT DOCUMENTS

| | | |
|---|---|---|
| CN | 113890614 A | 1/2022 |
| EP | 0035054 A1 | 9/1981 |

(Continued)

OTHER PUBLICATIONS

Broadcom, Transceiver for Optical Wireless Communications up to 1.25Gb/s, AFBR-FS13B25 Data Sheet, Apr. 19, 2021, 10 Pages.

(Continued)

*Primary Examiner* — Rhonda S Peace
(74) *Attorney, Agent, or Firm* — Dority & Manning, P.A.

(57) ABSTRACT

A rotary joint system can include a first member rotatable relative to a second member. The first member and second member can be coaxially aligned along a central axis and define a channel therethrough. The channel defines a central channel segment radially extending a defined distance from the central axis and an outer channel segment positioned outwardly of the central channel segment. A first communication device is operably coupled with the first member and is positioned on a first side portion of the channel. A second communication device is operably coupled with the second member and is positioned on a second side portion of the channel. The first communication device can be configured to transmit an optical signal to the second communication device through the outer channel segment.

19 Claims, 7 Drawing Sheets

(56)     References Cited

U.S. PATENT DOCUMENTS

| | | | |
|---|---|---|---|
| 8,334,490 B2 | 12/2012 | Schaub et al. | |
| 8,665,421 B1 | 3/2014 | Owen, III et al. | |
| 8,982,458 B2 | 3/2015 | Blackburn | |
| 9,046,659 B2* | 6/2015 | Doric | G02B 6/3604 |
| 9,310,191 B1 | 4/2016 | Corella et al. | |
| 2007/0140620 A1* | 6/2007 | Schorpp | G02B 6/3604 |
| | | | 385/47 |
| 2012/0213513 A1 | 8/2012 | Chao | |
| 2022/0187542 A1 | 6/2022 | Svec | |
| 2024/0168236 A1* | 5/2024 | Baltz | H04B 10/1143 |
| 2025/0055567 A1* | 2/2025 | Baltz | H04B 10/803 |

FOREIGN PATENT DOCUMENTS

| | | | |
|---|---|---|---|
| EP | 2488888 A1 | 8/2012 | |
| GB | 2163617 A | 2/1986 | |
| WO | WO2012/112351 A1 | 8/2012 | |

OTHER PUBLICATIONS

Li et al., Counter-Countermeasure Identification Based on Multi-Element Dual Band Infrared Detector, Applied Optics, vol. 52, Issue 21, 2013, pp. 5201-5207. (Abstract Only).

Hezel et al., Optical Slip Ring for Off-Axis High-Bit-Rate Data Transmission, Applied Optics, vol. 25, Issue 5, 1986, pp. 775-779. (Abstract Only).

Sun et al., Design and Analysis of a Multi-Element Dual Band Infrared Detector for Counter-Countermeasure, Optical Engineering 53, No. 1, Jan. 3, 2014. (Abstract Only).

European Search Report EP23210836 on Mar. 26, 2024.

\* cited by examiner

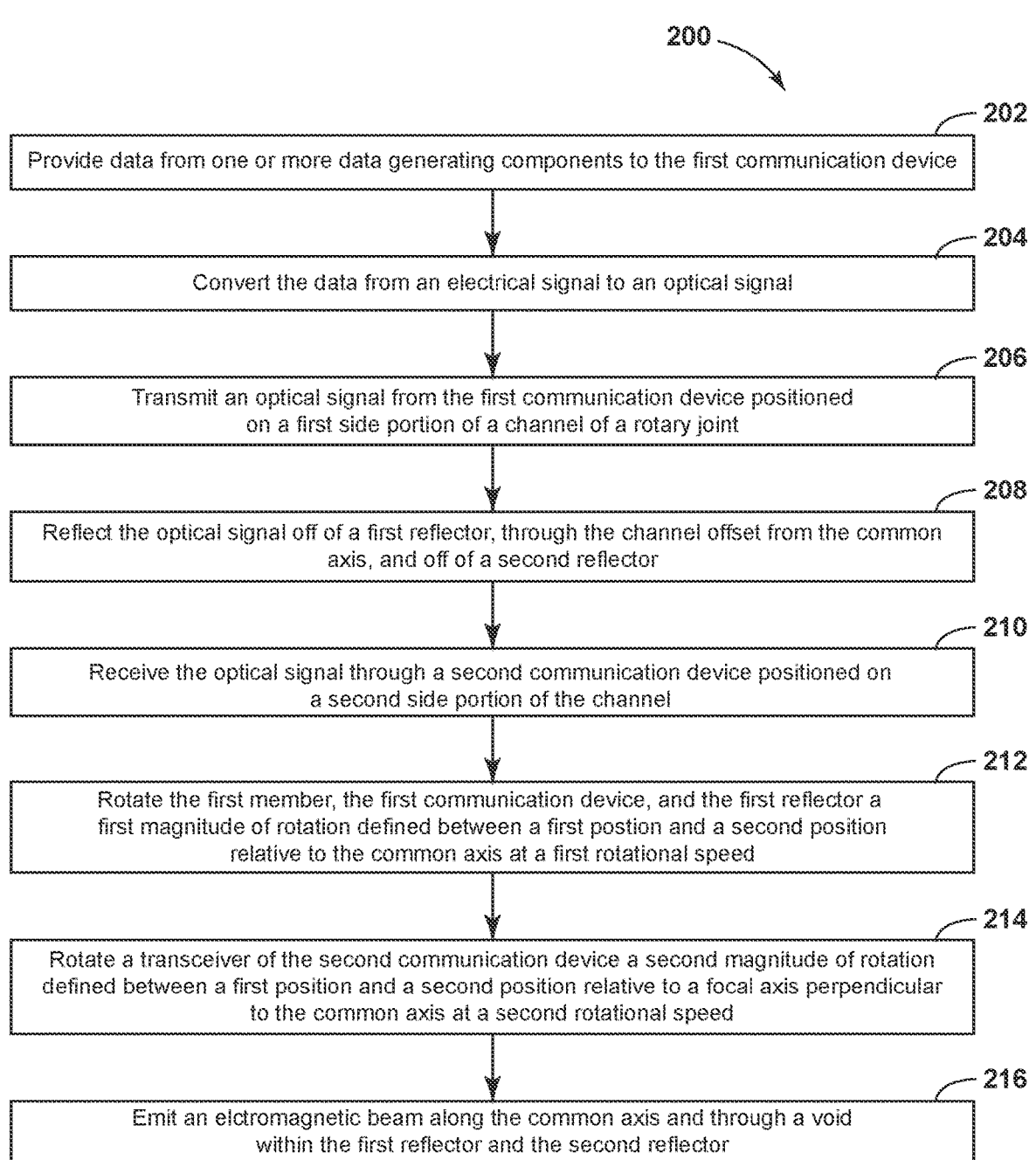

200

202
Provide data from one or more data generating components to the first communication device 204
Convert the data from an electrical signal to an optical signal 206
Transmit an optical signal from the first communication device positioned on a first side portion of a channel of a rotary joint 208
Reflect the optical signal off of a first reflector, through the channel offset from the common axis, and off of a second reflector 210
Receive the optical signal through a second communication device positioned on a second side portion of the channel 212
Rotate the first member, the first communication device, and the first reflector a first magnitude of rotation defined between a first postion and a second position relative to the common axis at a first rotational speed 214
Rotate a transceiver of the second communication device a second magnitude of rotation defined between a first position and a second position relative to a focal axis perpendicular to the common axis at a second rotational speed 216
Emit an elctromagnetic beam along the common axis and through a void within the first reflector and the second reflector

FIG. 10

ROTARY JOINT SYSTEM

FIELD

The present disclosure relates generally to rotary joints, and more particularly to a method and apparatus for transmitting signals across rotary joints.

BACKGROUND

Rotary joints generally include two units rotatably mounted relative to each other about a central axis of rotation. In some instances, data may be transmitted through the rotary joint with unidirectional or bidirectional signal transmission. However, in some cases, the data may need to be transmitted through a location of the rotary joint that is remote from the central axis of rotation. However, such off-axis data transmission may be limited in data transfer rates.

BRIEF DESCRIPTION

Aspects and advantages of the present disclosure will be set forth in part in the following description, or may be obvious from the description, or may be learned through practice of the present disclosure.

According to some aspects of the present disclosure, a rotary joint system includes a first member rotatable relative to a second member. The first member and second member are coaxially aligned along a central axis and define a channel therethrough. The channel defines a central channel segment radially extending a defined distance from the central axis and an outer channel segment positioned outwardly of the central channel segment. A first communication device is operably coupled with the first member and positioned on a first side portion of the channel. A second communication device is operably coupled with the second member and positioned on a second side portion of the channel. The first communication device is configured to transmit an optical signal to the second communication device through the outer channel segment.

According to some aspects of the present disclosure, a method for operating a rotary joint system. The method includes transmitting an optical signal from a first communication device positioned on a first side portion of a channel defined through first and second members coaxially aligned along a central axis, wherein the first and second members are rotatable relative to one another. The method also includes reflecting the optical signal off of a first reflector, through the channel at a radial location offset from the central axis, and off of a second reflector. Lastly, the method includes receiving the optical signal through a second communication device positioned on a second side portion of the channel.

According to some aspects of the present disclosure, a rotary joint system includes a first member rotatable relative to a second member. The first member and second member are coaxially aligned along a central axis and define a channel therethrough. The channel defines a central channel segment radially extending a defined distance from the central axis and an outer channel segment positioned outwardly of the central channel segment. A first communication device is positioned proximate to a first end portion of the channel and includes a first transceiver. A first reflector is fixed with respect to the first member and optically coupled with the first transceiver. A second communication device is positioned proximate to a second end portion of the channel and includes a second transceiver. The first transceiver and the second transceiver are configured to transmit an optical signal to one another through the outer channel segment. A second reflector is fixed with respect to the second member and optically coupled with the second transceiver.

These and other features, aspects, and advantages of the present disclosure will be further supported and described with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 10 illustrates a flow diagram of a method of operating the rotary joint in accordance with various aspects of the present disclosure.

Figure 1:
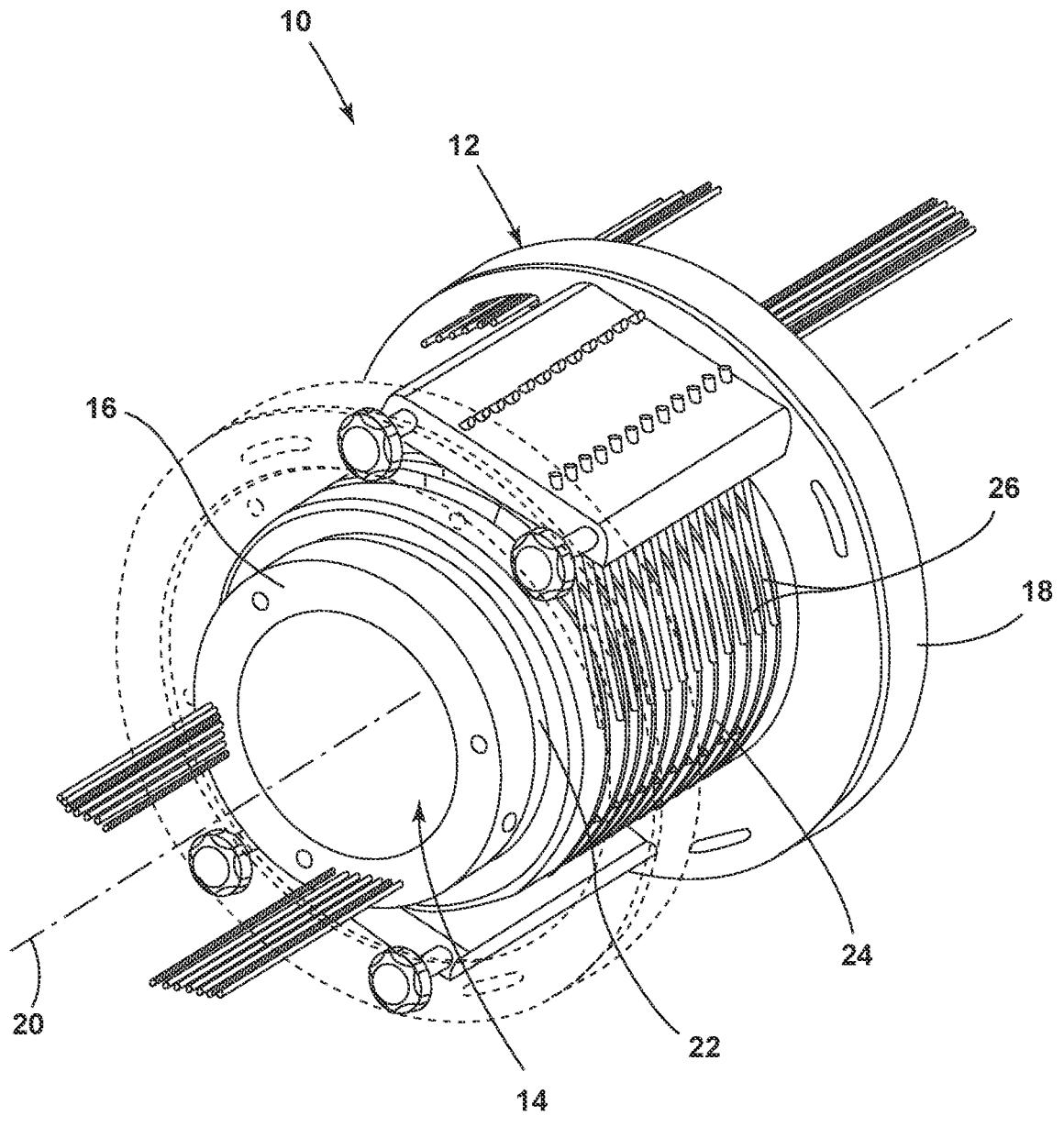
FIG. 1 illustrates a perspective view of a rotary joint in accordance with various aspects of the present disclosure.
Figure 2:
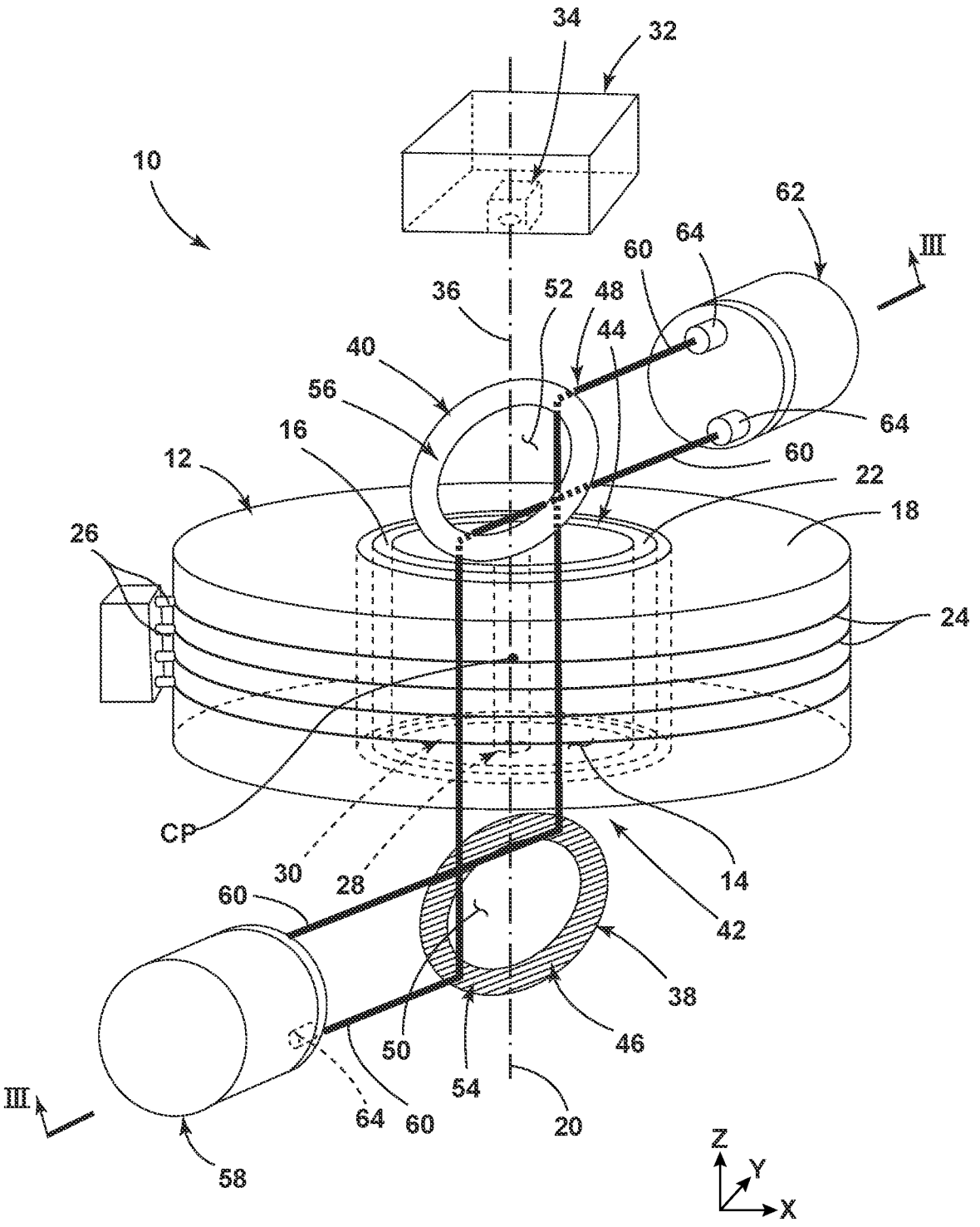
FIG. 2 illustrates a simplified perspective view of a rotary joint system incorporating a rotary joint in accordance with various aspects of the present disclosure.
Figure 3:
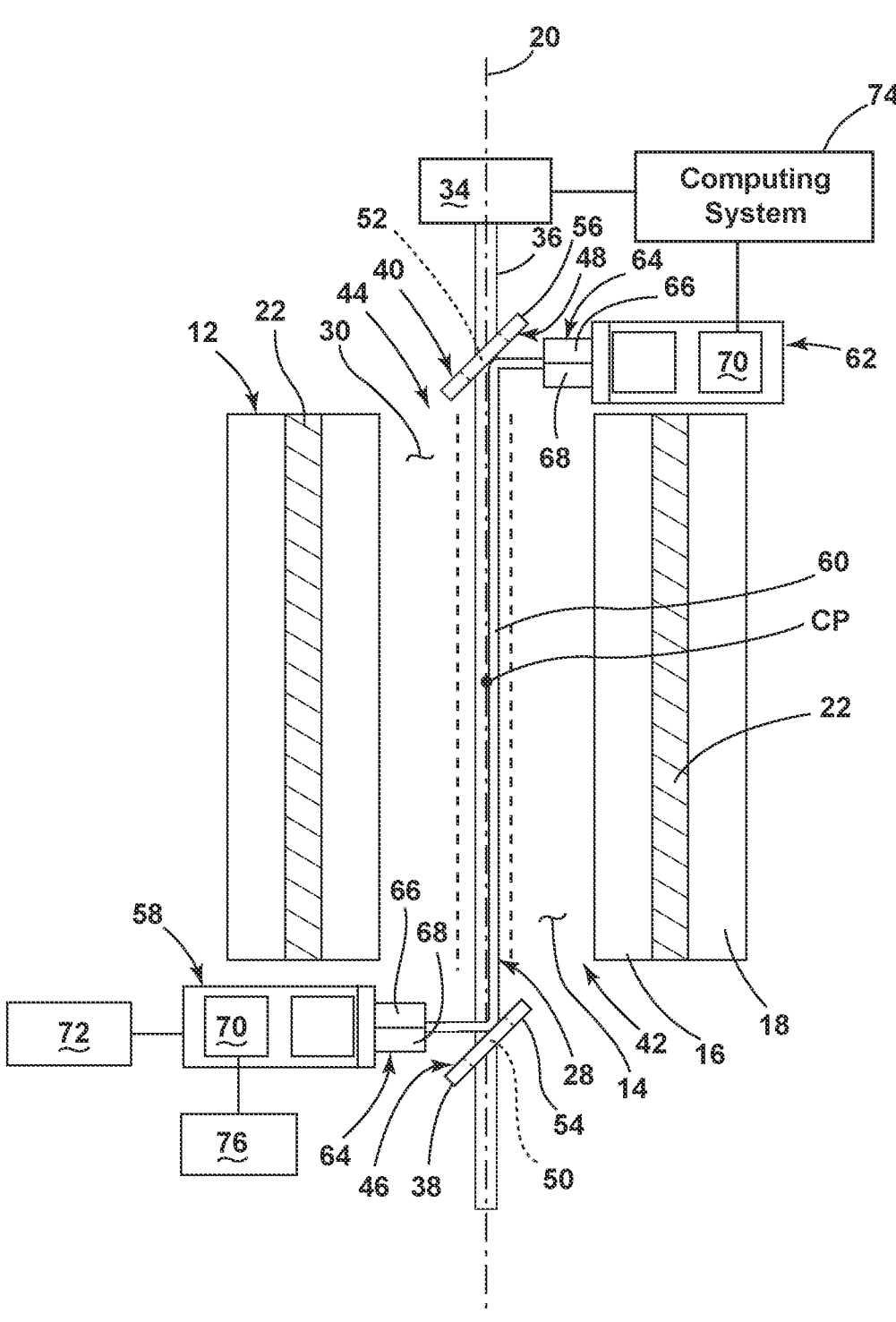
FIG. 3 illustrates a cross-sectional view of the rotary joint system taken along the line III-III of FIG. 2.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The terms "coupled," "fixed," "attached to," and the like refer to both direct coupling, fixing, or attaching, as well as indirect coupling, fixing, or attaching through one or more intermediate components or features, unless otherwise specified herein. Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the disclosed functionality, and any two components capable of being so associated can also be viewed as being "operably couplable" to each other to achieve the disclosed functionality. Some examples of operably couplable include, but are not limited to, physically mateable, physically interacting components, wirelessly interactable, wirelessly interacting components, logically interacting, and/or logically interactable components.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a rotary joint system and methods related to the rotary joint system. In some cases, the rotary joint system can include a first member rotatable relative to a second member. The first member and second can be coaxially aligned along a central axis and define a channel therethrough. Moreover, the channel can define a central channel segment radially extending a defined distance from the central axis and an outer channel segment positioned outwardly of the central channel segment.

A first communication device can be positioned proximate a first end portion of the channel that includes a first transceiver, and a second communication device can be positioned proximate a second end portion of the channel and includes a second transceiver. The first transceiver and the second transceiver transmit unidirectional or bidirectional signals to one another, which may be transmitted through the outer channel segment.

In some instances, a first reflector may be fixed with respect to the first member and configured to reflect the optical signal from the first transceiver into the outer channel segment or from the outer channel segment to the first optical transceiver. A second reflector may be fixed with respect to the second member and configured to reflect the optical signal from the second transceiver into the outer channel segment or from the outer channel segment to the second optical transceiver.

In various examples, the first communication device can define a first focal axis that is perpendicular to the central axis and the second communication device can define a second focal axis that is perpendicular to the central axis. The first transceiver may be mounted to a first mount and/or may be offset from the first focal axis. The second transceiver may be mounted to a second mount and/or may be offset from the second focal axis. An actuator may be configured to rotate the first mount and/or the second mount.

In operation, the first member, the first communication device, and the first reflector are configured to rotate a first magnitude of rotation at a first rotational speed from a first position to a second position relative to the central axis. In addition, the second mount is configured to be rotated by the actuator a second magnitude of rotation at a second rotational speed from a first position to a second position relative to the second focal axis. The first magnitude can be equal to the second magnitude and the first rotational speed can be equal to the second rotational speed to maintain the optical coupling of the first and second communication devices.

Further, the first reflector and the second can define a portion that reflects the optical signal and a second portion that may be at least partially aligned with the central channel segment. As such, one or more components may be positioned through the central channel segment while the signals are transmitted outward thereof. Additionally or alternatively, an electromagnetic beam, such as a laser beam, may be transmitted through the central channel segment while the signal is transmitted through the outer channel segment. In various examples, the optical system described herein may be used with a wide array of rotary joints while allowing off-axis data communication therethrough. The rotary joint system can allow for higher data transfer rates of 40 GB/second or more.

Referring now FIGS. 1-5, a rotary joint system 10 is schematically illustrated in accordance with various aspects of the present disclosure. In some examples, the rotary joint system 10 described herein may be implemented within infrared countermeasures systems that may protect aircraft, or other structures, from missiles. These systems, such as Infrared Countermeasure (IRCM) systems, detect and track a signature associated with an approaching missile, and generate high-power infrared laser signals which are transmitted as a countermeasure to confuse and defeat the attacking missile guidance system. However, it will be appreciated that the rotary joint system 10 described herein may be implemented within any other system without departing from the scope of the present disclosure.

In various examples, the rotary joint system 10 can incorporate a rotary joint 12 that defines a channel 14 through first and second members 16, 18. The first member 16 may be coaxially aligned with a second member 18 about a central axis 20. In various examples, each of the first member 16 and the second member 18 may be formed from a metallic material, a polymeric material, an elastomeric material, a composite material, a combination thereof, and/ or any other practicable material. It will be appreciated that the first and second members 16, 18 may be aligned in any manner without departing from the teachings provided herein. For example, the first member 16 may be at least partially positioned within the second member 18, an end portion of the first member 16 may be aligned with an end portion of the second member 18, and/or otherwise positioned to form a channel 14 therethrough.

At least one of the first and second members 16, 18 is rotatable about a central axis 20. For example, the first member 16 may be rotatable about the central axis 20 and the second member 18 may be stationary, the first member 16 may be stationary, and the second member 18 may be rotatable about the central axis 20, and/or each of the first member 16 and the second member 18 may be rotatable about the central axis 20. In various examples, a rotation assembly 22 may be positioned between at least a portion of the first member 16 and the second member 18 to assist with relative rotation between the first member 16 and the second member 18. For example, the rotation assembly 22 may include a rolling element (e.g., a bearing). In such instances, the first member 16 may define an inner race (or a gimbal) and the second member 18 may define an outer race (or turret) that, in combination, retain the rolling elements when the position of the first member 16 is altered relative to the second member 18. Additionally or alternatively, the rolling element may be operably coupled with the first member 16 and the second member 18. Additionally or alternatively, the rotation assembly 22 may include a material, such as a lubricant, which may be disposed between the first member 16 and the second member 18 to reduce a frictional coefficient between the first member 16 and the second member 18 when one or both of the first member 16 and the second member 18 are rotated relative to one another.

To provide power across the rotary joint 12, in some examples, one or more conductive rings 24 and conductive brushes 26 may be employed. For example, the conductive rings 24 may be arranged between the first and second members 16, 18 and may be aligned with the central axis 20. The conductive brushes 26 may be arranged to be able to make contact with the conductive rings 24 to allow for power flow between the conductive rings 24 and conductive brushes 26. In various examples, the conductive rings 24 are attached to the first member 16, and the conductive brushes 26 are attached to the second member 18. In this example, the conductive rings 24 may rotate together with the first member 16 and the conductive brushes 26 may remain stationary with the second member 18. In another example, the conductive rings 24 are attached to the second member 18, and the conductive brushes 26 are attached to the first member 16. In some examples, power may be provided by a conventional metal-contact slip ring. Additionally, in various examples, an outer shell may be positioned on an opposing side of the brushes 26 from the central axis 20.

With further reference to FIGS. 1-5, the channel 14 can define a central channel segment 28 and an outer channel segment 30. The central channel segment 28 may circumscribe the central axis 20 of the channel 14 by a defined radius r. The outer channel segment 30 may be defined as a space between the central channel segment 28 and an interior wall portion of the second member 18 (or any other space that is located between the central channel segment 28 and the second member 18).

Referring further to FIGS. 1-5, the rotary joint system 10 can include a transmission assembly 32 that includes one or more components (e.g., wires, cables, etc.) positioned within the central channel segment 28. Additionally or alternatively, the transmission assembly 32 can be configured to transmit a transmission (e.g., an electromagnetic beam 36 and/or any other transmittable output) through the central channel segment 28. For example, the transmission assembly 32 may include a light source 34 that is configured to emit a laser beam through the central channel segment 28.

Referring still to FIGS. 1-5, a first reflector 38 and a second reflector 40 may be respectively positioned proximately to opposing end portions 42, 44 of the channel 14. In some examples, the first and second reflectors 38, 40 may include respective reflective surfaces 46, 48. Each of the reflective surfaces may include at least a portion that is offset from the central channel segment 28. For example, the first reflector 38 and/or the second reflector 40 may define a void 50, 52 therein that aligns with the central channel segment 28 relative to the central axis 20 and a rim portion 54, 56 circumscribing of the void 50, 52.

As shown in FIGS. 1-5, a first communication device 58 may be positioned at least partially on a first side portion of a center point cp of the channel 14 along the central axis 20. A second communication device 62 may be remote from and positioned at least partially on a second side portion of the center point cp of the channel 14 along the central axis 20. In various examples, the first communication device 58 may be configured to transmit, receive, and/or both transmit and receive signals and/or any other information. Similarly, the second communication device 62 may be configured to transmit, receive, and/or both transmit and receive signals and/or any other information. In some examples, each of the first communication device 58 and/or the second communication device 62 can include one or more transceivers 64. In various examples, each of the one or more transceivers 64 can transmit and/or receive the signals and/or any other information through the channel 14. Moreover, the signals and/or other information may be transmitted through the outer channel segment 30. As such, the signals and/or other information may be transmitted simultaneously (or at an offset time) from a transmission through the central channel segment 28. Likewise, the signals and/or other information may be transmitted while one or more components are positioned within the central channel segment 28.

In various examples, each of the one or more transceivers 64 can include a transmitter unit 66 configured to generate an optical signal 60 (e.g., a light beam and/or any other electromagnetic beam). The transmitter unit 66 may include a light source that may be optically coupled with a lens to focus or collimate light generated by the light source into the optical signal 60. Additionally, the one or more transceivers 64 can include a receiver unit 68 configured to receive an optical signal 60. In some examples, the receiver unit 68 can include optics for concentrating the incoming optical signal 60. The optics can be imaging optics with a photodetector at the focal plane or non-imaging optics such as a Winston cone.

A processing unit 70 can be operably coupled with the transmitter unit 66 and the receiver unit 68. In some cases, the processing unit 70 can act as an electrical signal to an optical signal 60 (e.g., electromagnetic radiation) and an optical signal 60 to an electrical signal converter. In general, the processing unit 70 may include one or more processor-based devices, such as a given controller or computing device or any suitable combination of controllers or computing devices. Thus, in several embodiments, the processing unit 70 may include one or more processor(s), and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application-specific integrated circuit, and other programmable circuits. Additionally, As used herein, the term "memory device(s)" may generally refer to any practicable memory element(s) including, but not limited to, a computer-readable medium (e.g., random access memory RAM)), a computer-readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) may generally be configured to store suitable computer-readable instructions that, when implemented by the processor(s), configure the processing unit 70 to perform various computer-implemented functions, such as one or more aspects of the methods and algorithms that will be described herein. In addition, the processing unit 70 may also include various other suitable components, such as control electronics for the transceiver 64, a photodetector for converting the received optical signal 60 to electrical signals, amplifiers to boost the electrical strength to that compatible with a decoder of the processing unit 70, a communications circuit or module, one or more input/output channels, a data/control bus, and/or the like.

In some examples, the first communication device 58 may be operably coupled with one or more data-generating components 72, such as a sensor. For example, the sensor may be one or more of an imaging device, a positioning device (e.g., an accelerometer, global positioning system, etc.), proximity sensor, electromagnetic radiation sensor (e.g., an infrared sensor, a passive infrared sensor, etc.), ultrasonic sensor, color sensor, humidity sensor, magnetic sensor (e.g., a hall effect sensor), microphone (sound sensor), pressure sensor, and/or any other type of sensor.

Data generated by the one or more data generating components may be provided to the processing unit 70 of the first communication device 58. In turn, the data may be converted to an optical signal 60 that is transmitted from the transmitter unit 66 of the first communication device 58. The optical signal 60 emitted from the transmitter unit 66 may be reflected off of the first reflector 38 and into the channel 14 in an offset position from the central channel segment 28. The optical signal 60 may then be reflected off of the second reflector 40 on an opposing side portion of the channel 14 and towards the second communication device 62. For instance, the optical signal 60 may be received by a receiving unit of the second communication device 62. In turn, the processing unit 70 of the second communication device 62 may convert the optical signal 60 to an electrical signal. The electrical signal may be transmitted to a computing system 74 operably coupled with the second communication device 62. In turn, the computing system 74 may store the data provided by the one or more data-generating devices, process the data provided by the one or more data-generating devices, and/or generate one or more outputs based on the data provided by the one or more data-generating devices.

In some instances, the computing system 74 may further provide instructions to the data-generating components 72. In such instances, the computing system 74 may provide the instructions to the second communication device 62, which is then converted to an optical signal 60 that may be emitted from the transmitter unit 66 of the second communication device 62 to the second reflector 40. The optical signal 60 may then be reflected off of the first reflector 38 and towards the receiving unit of the first communication device 58. In turn, the processing unit 70 of the first communication device 58 may convert the optical signal 60 to an electrical signal that is provided to the data-generating components 72. It will be appreciated that instructions may be provided to any other electrically-controllable devices 76 operably coupled with the first communication device 58 without departing from the teachings provided herein.

Figure 4:
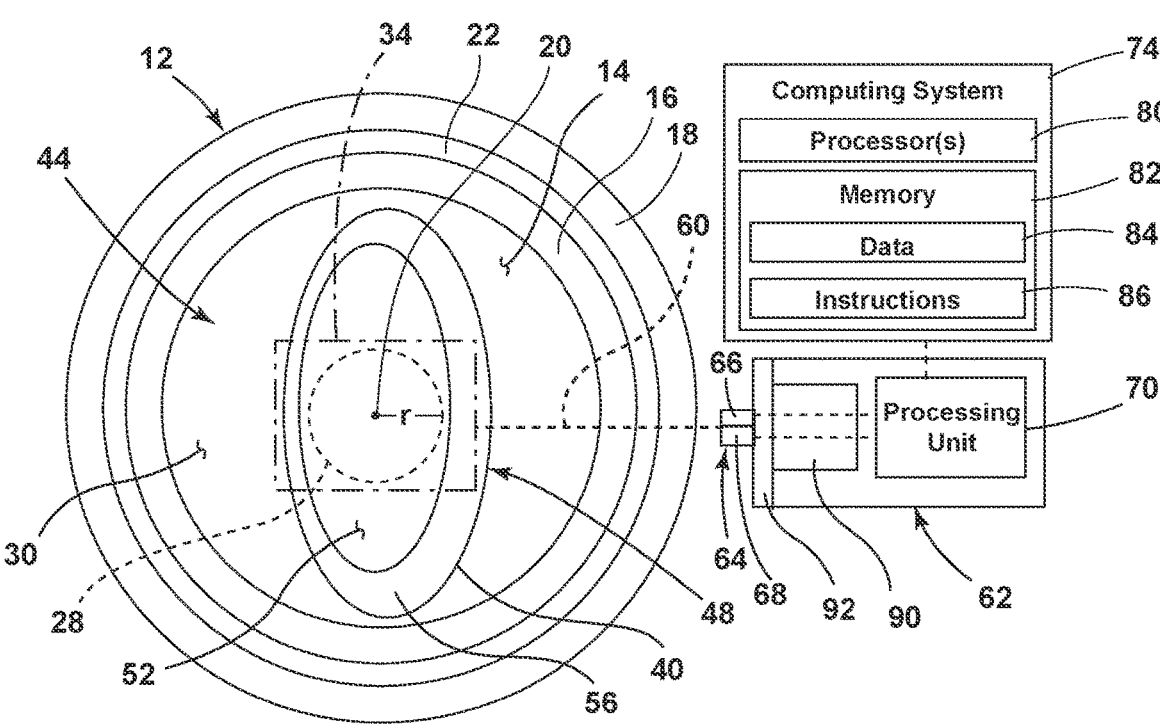
FIG. 4 illustrates a top view of the rotary joint system in accordance with various aspects of the present disclosure.
Figure 5:
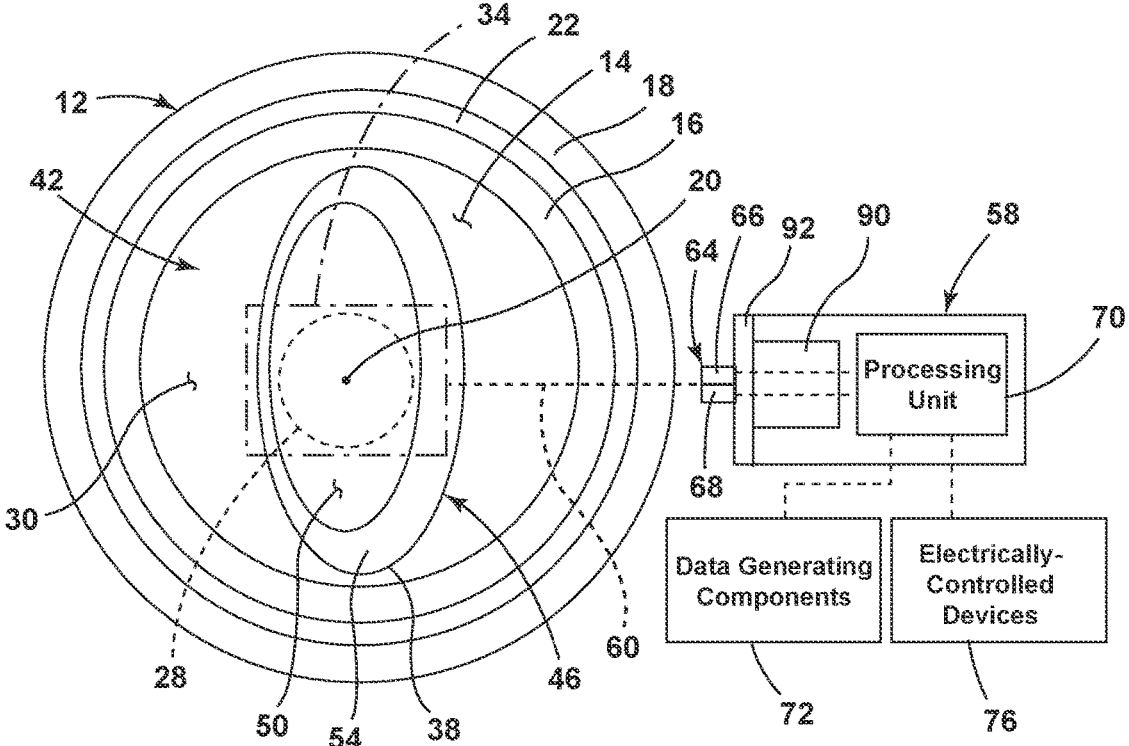
FIG. 5 illustrates a bottom view of the rotary joint system in accordance with various aspects of the present disclosure.

In general, the computing system 74 may correspond to any suitable processor-based device(s), such as a computing device or any combination of computing devices. Thus, as shown in FIG. 4, the computing system 74 may generally include one or more processor(s) 80 and associated memory devices 82 configured to perform a variety of computer-implemented functions (e.g., performing the methods, steps, algorithms, calculations, and the like disclosed herein). Such memory 82 may generally be configured to store information accessible to the processor(s) 80, including data 84 that can be retrieved, manipulated, created, and/or stored by the processor(s) 80 and instructions 86 that can be executed by the processor(s) 80.

Referring now to FIGS. 4-7, as provided herein, the first member 16 may be rotatable about the central axis 20 and the second member 18 may be stationary, the first member 16 may be stationary and the second member 18 may be rotatable about the central axis 20, and/or each of the first member 16 and the second member 18 may be rotatable about the central axis 20. To maintain optical coupling of the first communication device 58 with the second communication device 62, the first reflector 38, and the first communication device 58 may rotate with the first member 16 from a first position, an example of which is provided in FIG. 6, to a second position, an example of which is provided in FIG. 7, while the second reflector 40 and the second communication device 62 remain in a common location relative to the central axis 20.

Additionally, the first communication device 58 and/or the second communication device 62 can include an actuator 90 that is configured to rotate each of the one or more transceivers 64. The actuators 90 may be any type of rotary actuator, such as a servomotor, which may be electrically or otherwise powered. In various examples, the actuators 90 may be activated/deactivated by the processing units 70 of each respective communication device 58, 62. Additionally or alternatively, the activation/deactivation of each actuator 90 may be controlled by any other device that is operably coupled with the first communication device 58 and/or the second communication device 62.

In the illustrated examples, each of the transceivers 64 of the first communication device 58 may be operably coupled with a first rotational mount 92 such that each transceiver 64 may rotate contemporaneously with one another. However, in other examples, one or more of the transceivers 64 may otherwise be operably coupled with one or more actuators 90 such that the transceivers 64 of the first communication device 58 may move relative to one another based on the activation/deactivation of the one or more actuators 90 within the first communication device 58. Likewise, in the illustrated examples, each of the transceivers 64 of the second communication device 62 may be operably coupled with a second rotational mount 92 such that each transceiver 64 may rotate contemporaneously with one another. However, in other examples, one or more of the transceivers 64 may otherwise be operably coupled with one or more actuators 90 such that the transceivers 64 of the second communication device 62 may move relative to one another based on the activation/deactivation of the one or more actuators 90 within the second communication device 62.

Figures 6, 7:
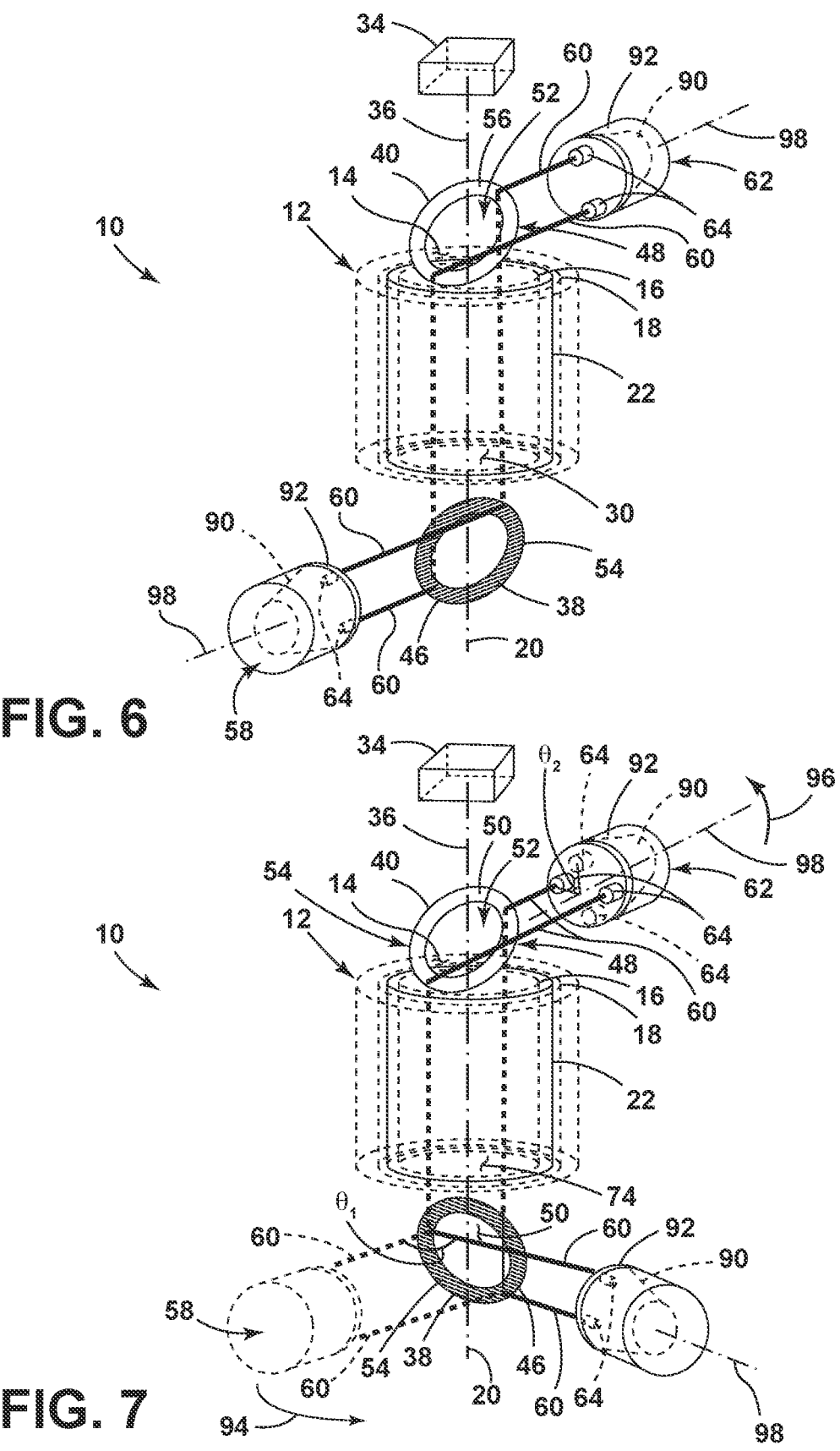
FIG. 6 illustrates a simplified perspective view of a first rotatable member of the rotary joint system in a first position in accordance with various aspects of the present disclosure.
FIG. 7 illustrates a simplified perspective view of a first rotatable member of the rotary joint system in a second position in accordance with various aspects of the present disclosure.
Figures 8, 9:
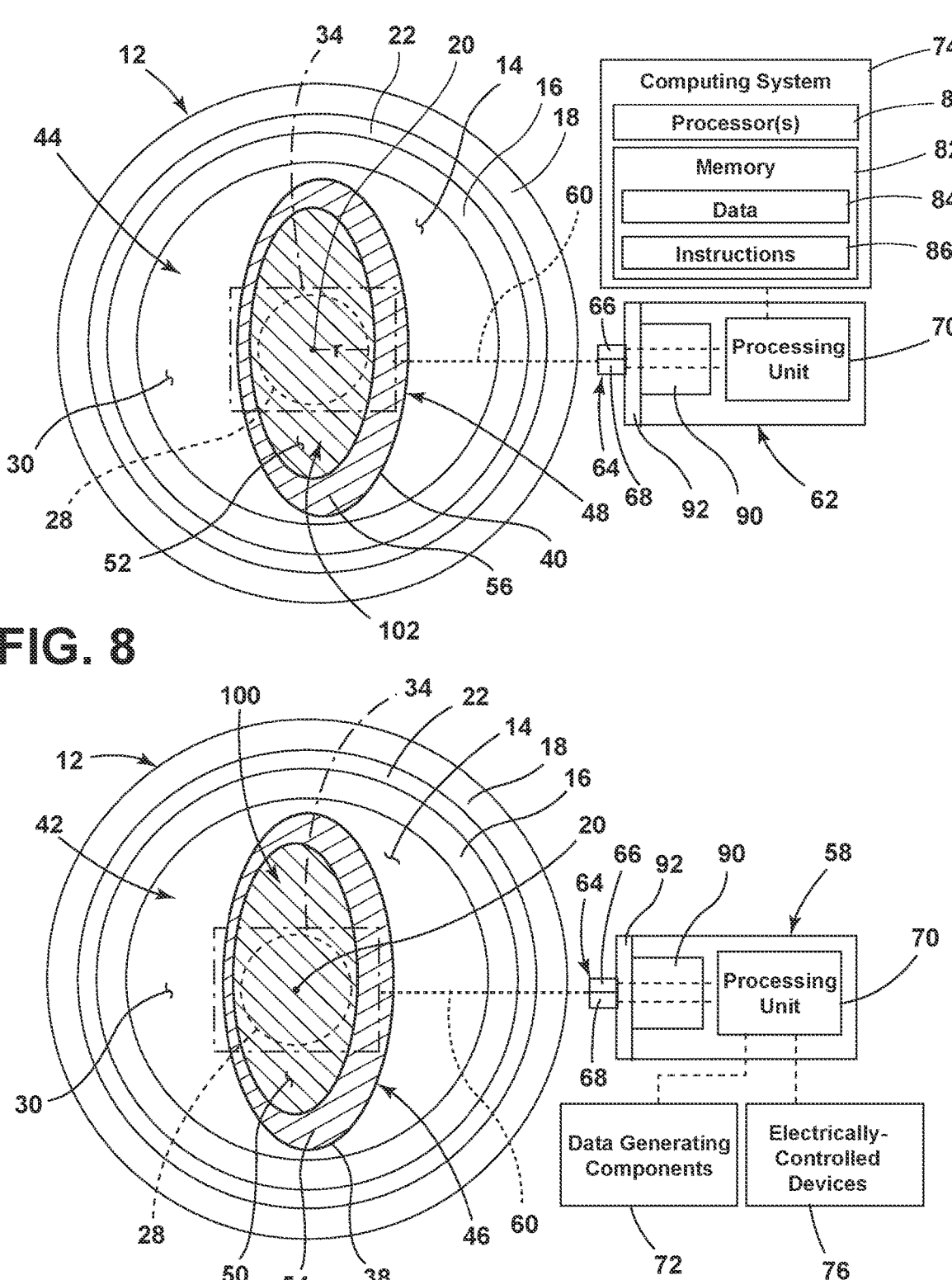
FIG. 8 illustrates a top view of the rotary joint system in accordance with various aspects of the present disclosure.
FIG. 9 illustrates a bottom view of the rotary joint system in accordance with various aspects of the present disclosure.

In operation, as the first member 16, the first communication device 58, and the first reflector 38 move from the first position to the second position, as indicated by arrow 94 in FIG. 7, by a first magnitude $\theta_1$ relative to the central axis 20, the actuator 90 of the second communication device 62 may rotate the one or more transceivers 64 of the second communication device 62, as indicated by arrow 96 in FIG. 7, by a second magnitude $\theta_2$ relative to a focal axis 98. As the first member 16, the first communication device 58, and the first reflector 38 move from the first position to the second position in a counterclockwise direction relative to the central axis 20, the one or more transceivers 64 of the second communication device 62 may also rotate in a counterclockwise direction, and vice versa.

In the illustrated example, the focal axis 98 is generally orthogonal to the central axis 20 and the reflectors generally extend at a forty-five degree angle relative to the central axis 20. However, in other examples, the reflectors may be positioned at other angles relative to the central axis 20. In turn, the focal axis 98 may be adjusted to accommodate the offsets of the reflectors.

In various examples, in addition to the rotation of the transceivers 64 within the second communication device 62 or as an alternative, the transceivers 64 of the first communication device 58 may be rotated to maintain an optical coupling of the first communication device 58 and the second communication device 62 as the first member 16 rotates from a first position to a second position.

In some cases, the first communication device 58 and/or the second communication device 62 can include an array of transceivers 64 that allow for the processing unit 70 (or the computing system 74) to determine a transmitted optical signal 60 based on the first magnitude of the rotation through one or more suitable processes, which may include the use of one or more algorithms, look-up tables, etc.

Referring to 8 and 9, in some examples, the first reflector 38 and/or the second reflector 40 may have portions thereof that allow for light passage through and/or reflect light based on the wavelength of light. For example, the first reflector 38 may define a first rim portion 54 optically coupled with the first transceiver 64 and a first internal portion 100. The first internal portion 100 may be of large enough area to align with the central channel segment 28 and/or be otherwise aligned with the central axis 20. Likewise, the second reflector 40 may define a second rim portion 56 optically coupled with the second transceiver 64 and a second internal portion 102. The second internal portion 102 may also be of an area to align with the central channel segment 28 and/or be otherwise aligned with the central axis 20.

In some examples, the first internal portion 100 and the second internal portion 102 may be configured to allow electromagnetic beams 36 of a defined wavelength to pass therethrough. For instance, the first rim portion 54 and/or the second rim portion 56 may include a first coating or material that reflects electromagnetic signals within a first spectrum range while allowing electromagnetic beams 36 within a second spectrum range to pass therethrough. Alternatively, the first internal portion 100 and/or the second internal portion 102 may allow light therethrough that is within a defined spectrum range. For example, in some cases, the light source 34 may be configured to generate a light beam that may pass through the central channel segment 28 while also passing through the first internal portion 100 and the second internal portion 102. In addition, the optical signals 60 generated by the first communication device 58 and/or the second communication device 62 may be reflected by the first rim portion 54, the second rim portion 56, the first internal portion 100, and/or the second internal portion 102. In various examples, to allow for selective reflectivity of the various portions, one or more coatings, dichroic filters, or materials may be applied to the first reflector 38 and/or the second reflector 40.

Referring now to FIG. 10, a flow diagram for operating a rotary joint system according to various examples of the present disclosure is illustrated. In general, the method 200 will be described herein with reference to the rotary joint illustrated in FIGS. 1-9. However, it should be appreciated that the disclosed method 200 may be implemented with optical mount assemblies having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, at (202), the method 200 may include providing data from one or more data-generating components to the first communication device. As provided herein, the one or more data generating components may include one or more of an imaging device, a positioning device (e.g., an accelerometer, global positioning system, etc.), proximity sensor, electromagnetic radiation sensor (e.g., an infrared sensor, a passive infrared sensor, etc.), ultrasonic sensor, color sensor, humidity sensor, magnetic sensor (e.g., a hall effect sensor), microphone (sound sensor), pressure sensor, and/or any other type of sensor. Data generated by the one or more data generating components may be provided to the processing unit of the first communication device.

At (204), the method can include converting the data from an electrical signal to an optical signal, which may be completed by the processing unit of the first communication device. Once converted, at (206), the method 200 can include transmitting an optical signal from the first communication device. In some examples, the optical signal may be transmitted through a channel defined by a rotary joint. In some cases, the rotary joint can include first and second members coaxially aligned along a central axis with at least one of the first member and/or the second member being rotatable relative to one another. In various examples, the first communication device may be positioned on a first side portion of the channel.

At (208), the method 200 can include reflecting the optical signal off of a first reflector, through an outer channel segment that is at a radial location offset from the central axis, and off of a second reflector. As such, the optical signal may be transferred through the channel without interference with a central channel segment. In turn, at (210), the method 200 can include receiving the optical signal through a second communication device positioned on a second side portion of the channel.

At (212), the method 200 can include rotating the first member, the first communication device, and the first reflector a first magnitude of rotation defined between a first position and a second position relative to the central axis at a first rotational speed. At (214), the method 200 can include rotating a transceiver of the second communication device a second magnitude of rotation defined between a first position and a second position relative to a focal axis perpendicular to the central axis at a second rotational speed. In some cases, steps (212) and (214) occur simultaneously with the first magnitude equal to the second magnitude and the first rotation speed equal to the second rotational speed.

At (216), the method 200 can include emitting an electromagnetic beam along the central axis and through a void defined respectively by the first reflector and the second reflector. In some cases, the electromagnetic beam may be a laser beam that is configured to pass through the first reflector, the channel, and the second reflector uninhibited.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the processing units, the computing system, and/or through a network/cloud and may be used to evaluate and update the algorithms and/or methods described herein.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or instructions that influence the operation of a computer or controller. They may exist in a computer-executable form, such as vehicle code, which is the instructions and data directly executed by a computer's central processing unit or by a controller, or a human-understandable form, such as source code, which may be compiled to be executed by a computer's central processing unit or by a controller, or an intermediate form, such as object code, which is produced by a compiler. As used herein, the term "software code" or "code" also includes any human-understandable computer instructions or instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotary joint system comprising:
a first member rotatable relative to a second member, the first member and second member coaxially aligned along a central axis and defining a channel therethrough, wherein the channel defines a central channel segment radially extending a defined distance from the central axis and an outer channel segment positioned outwardly of the central channel segment;
a first communication device operably coupled with the first member and positioned on a first side portion of the channel, the first communication device defining a first focal axis that is perpendicular to the central axis, wherein the first communication device includes a first transceiver and a first actuator configured to rotate the first transceiver about the first focal axis; and
a second communication device operably coupled with the second member and positioned on a second side portion of the channel, the second communication device defining a second focal axis that is perpendicular to the central axis, wherein the second communication device includes a second transceiver and a second actuator configured to rotate the second transceiver about the second focal axis, and wherein the first communication device is configured to transmit an optical signal to the second communication device through the outer channel segment.

2. The rotary joint system of claim 1, further comprising:
a first reflector fixed with respect to the first member and configured to reflect the optical signal from the first communication device into the outer channel segment or from the outer channel segment to the first communication device, wherein the first transceiver is rotatable about the first focal axis through actuation of the first actuator; and
a second reflector fixed with respect to the second member and configured to reflect the optical signal from the second communication device into the outer channel segment or from the outer channel segment to the second communication device, wherein the second transceiver is rotatable about the second focal axis through actuation of the second actuator.

3. The rotary joint system of claim 2, wherein the first reflector defines a first rim portion, the first rim portion defining a first void at least partially aligned with the central channel segment, and wherein the second reflector defines a second rim portion, the second rim portion defining a second void at least partially aligned with the central channel segment.

4. The rotary joint system of claim 3, further comprising:
one or more components positioned within the central channel segment.

5. The rotary joint system of claim 3, further comprising:
a light source configured to emit an electromagnetic beam through the central channel segment.

6. The rotary joint system of claim 5, wherein the electromagnetic beam is a laser beam.

7. The rotary joint system of claim 2, wherein the first transceiver is mounted to a first mount and is offset from the first focal axis, and wherein the second transceiver is mounted to a second mount and is offset from the second focal axis.

8. The rotary joint system of claim 7, wherein the second communication device includes an actuator configured to rotate the second mount.

9. The rotary joint system of claim 8, wherein the first member, the first communication device, and the first reflector are configured to rotate a first magnitude of rotation at a first rotational speed from a first position to a second position relative to the central axis.

10. A rotary joint system comprising:
   a first member rotatable relative to a second member, the first member and the second member coaxially aligned along a central axis and defining a channel therethrough, wherein the channel defines a central channel segment radially extending a defined distance from the central axis and an outer channel segment positioned outwardly of the central channel segment;
   a first communication device positioned proximate to a first end portion of the channel and including a first transceiver and a second transceiver;
   a first reflector fixed with respect to the first member and optically coupled with the first transceiver and the second transceiver;
   a second communication device positioned proximate to a second end portion of the channel and including a third transceiver and a fourth transceiver, wherein the first transceiver and the third transceiver are configured to transmit a first optical signal to one another through the outer channel segment and the second transceiver and the fourth transceiver are configured to transmit a second optical signal to one another through the outer channel segment, the first optical signal offset from the second optical signal relative to the central axis; and
   a second reflector fixed with respect to the second member and optically coupled with the third transceiver and the fourth transceiver.

11. The system of claim 10, wherein the first reflector is configured to reflect the first optical signal from the first transceiver into the outer channel segment or from the outer channel segment to the first transceiver, and wherein the second reflector is configured to reflect the first optical signal from the third transceiver into the outer channel segment or from the outer channel segment to the third transceiver.

12. The system of claim 10, wherein the first reflector defines a first rim portion optically coupled with the first transceiver, the first rim portion defining a first void, and wherein the second reflector defines a second rim portion, the second rim portion defining a second void, the central axis extending through the first void and the second void.

13. The system of claim 10, wherein the first reflector defines a first rim portion optically coupled with the first transceiver and a first internal portion, and wherein the second reflector defines a second rim portion and a second internal portion, the first internal portion and the second internal portion being configured to allow an electromagnetic beam of a defined wavelength to pass therethrough.

14. The system of claim 10, wherein at least one of the first transceiver and the second transceiver are offset from the first focal axis.

15. The system of claim 10, wherein at least one of the third transceiver and the fourth transceiver are offset from the first focal axis.

16. A rotary joint system comprising:
   a first member rotatable relative to a second member, the first member and second member coaxially aligned along a central axis and defining a channel therethrough, wherein the channel defines a central channel segment radially extending a defined distance from the central axis and an outer channel segment positioned outwardly of the central channel segment;
   a first communication device operably coupled with the first member and positioned on a first side portion of the channel, wherein the first communication device defines a first focal axis that is perpendicular to the central axis, wherein the first communication device includes a first transceiver mounted to a first mount and is offset from the first focal axis;
   a first reflector fixed with respect to the first member and configured to reflect an optical signal from the first communication device into the outer channel segment or from the outer channel segment to the first communication device, wherein the first reflector defines a first rim portion, the first rim portion defining a first void at least partially aligned with the central channel segment, and wherein the first member, the first communication device, and the first reflector are configured to rotate a first magnitude of rotation at a first rotational speed from a first position to a second position relative to the central axis;
   a second communication device operably coupled with the second member and positioned on a second side portion of the channel, wherein the second communication device includes a second transceiver mounted to a second mount and is offset from a second focal axis, the second communication device further including an actuator configured to rotate the second mount, wherein the first communication device is configured to transmit the optical signal to the second communication device through the outer channel segment, and wherein the second communication device defines the second focal axis that is perpendicular to the central axis, wherein the second mount is configured to be rotated by the actuator a second magnitude of rotation at a second rotational speed from a first position to a second position relative to the second focal axis, and wherein the first magnitude is equal to the second magnitude and the first rotational speed is equal to the second rotational speed; and
   a second reflector fixed with respect to the second member and configured to reflect the optical signal from the second communication device into the outer channel segment or from the outer channel segment to the second communication device, wherein the second reflector defines a second rim portion, the second rim portion defining a second void at least partially aligned with the central channel segment.

17. The rotary joint system of claim 16, further comprising:
   one or more components positioned within the central channel segment.

18. The rotary joint system of claim 16, further comprising:
   a light source configured to emit an electromagnetic beam through the central channel segment.

19. The rotary joint system of claim 18, wherein the electromagnetic beam is a laser beam.

* * * * *